United States Patent
Liu et al.

(10) Patent No.: US 11,068,697 B2
(45) Date of Patent: Jul. 20, 2021

(54) METHODS AND APPARATUS FOR VIDEO-BASED FACIAL RECOGNITION, ELECTRONIC DEVICES, AND STORAGE MEDIA

(71) Applicant: BEIJING SENSETIME TECHNOLOGY DEVELOPMENT CO., LTD, Beijing (CN)

(72) Inventors: Wentao Liu, Beijing (CN); Chen Qian, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 29 days.

(21) Appl. No.: 16/455,173

(22) Filed: Jun. 27, 2019

(65) Prior Publication Data

US 2019/0318153 A1    Oct. 17, 2019

Related U.S. Application Data

(63) Continuation of application No. PCT/CN2018/117662, filed on Nov. 27, 2018.

(30) Foreign Application Priority Data

Nov. 30, 2017  (CN) .......................... 201711243717.9

(51) Int. Cl.
*G06K 9/00* (2006.01)
*G06K 9/62* (2006.01)

(52) U.S. Cl.
CPC ..... *G06K 9/00255* (2013.01); *G06K 9/00268* (2013.01); *G06K 9/00711* (2013.01); *G06K 9/6262* (2013.01)

(58) Field of Classification Search
CPC .......... G06K 9/00255; G06K 9/00268; G06K 9/00711; G06K 9/6262; G06K 9/036; G06K 9/00261; G06K 9/4628; G06K 9/00288
See application file for complete search history.

(56) References Cited

U.S. PATENT DOCUMENTS

| 5,699,449 | A | 12/1997 | Javidi |
| 7,796,785 | B2 * | 9/2010 | Takemoto ................ H04N 5/91 382/118 |

(Continued)

FOREIGN PATENT DOCUMENTS

| CN | 102752540 A | 10/2012 |
| CN | 103530652 A | 1/2014 |

(Continued)

OTHER PUBLICATIONS

International Search Report in the international application No. PCT/CN2018/117662, dated Mar. 1, 2019.

(Continued)

*Primary Examiner* — John B Strege
(74) *Attorney, Agent, or Firm* — Syncoda LLC; Feng Ma

(57) ABSTRACT

Methods and apparatuses for video-based facial recognition, devices, media, and programs can include: forming a face sequence for face images, in a video, appearing in multiple continuous video frames and having positions in the multiple video frames meeting a predetermined displacement requirement, wherein the face sequence is a set of face images of a same person in the multiple video frames; and performing facial recognition for the face sequence by using a preset face library at least according to face features in the face sequence.

19 Claims, 6 Drawing Sheets

(56) References Cited

U.S. PATENT DOCUMENTS

| | | | | |
|---|---|---|---|---|
| 8,861,804 B1* | 10/2014 | Johnson | ................. | G06F 16/51 |
| | | | | 382/118 |
| 2005/0207622 A1* | 9/2005 | Haupt | ............... | G06K 9/00711 |
| | | | | 382/118 |
| 2016/0132717 A1* | 5/2016 | Iliadis | ............... | G06K 9/00295 |
| | | | | 382/118 |
| 2017/0286759 A1* | 10/2017 | Yao | .................... | G06K 9/00315 |

FOREIGN PATENT DOCUMENTS

| | | |
|---|---|---|
| CN | 104008370 A | 8/2014 |
| CN | 104036236 A | 9/2014 |
| CN | 105631408 A | 6/2016 |
| CN | 105868695 A | 8/2016 |
| CN | 106919917 A | 7/2017 |
| CN | 108229322 A | 6/2018 |
| WO | WO-0016243 A1 * 3/2000 ......... G06K 9/00221 |

OTHER PUBLICATIONS

Li, Xintao, "Research of Video Face Recognition Based on Weighted Voting and Key-Frame Extraction", China Masters' Theses Full-text Database, the sixth period, Jun. 15, 2012 (Jun. 15, 2012), p. 1138-1851.

First Office Action of Chinese application No. 201711243717.9, dated Dec. 3, 2019.

* cited by examiner

METHODS AND APPARATUS FOR VIDEO-BASED FACIAL RECOGNITION, ELECTRONIC DEVICES, AND STORAGE MEDIA

CROSS-REFERENCE TO RELATED APPLICATIONS

This is a continuation of International patent application No. PCT/CN2018/117662 filed on Nov. 27, 2018, which claims priority to Chinese Patent Application No. 201711243717.9 filed on Nov. 30, 2017. The disclosures of these applications are incorporated herein by reference in their entirety.

BACKGROUND

Recognition of humans in a video provides an information support for multiple applications. For example, by recognizing humans in a video, a theme character of the video can be obtained. In another example, by recognizing humans in a video, classified management of videos can be implemented.

SUMMARY

The present disclosure relates to computer vision technologies, and in particular, to methods and apparatuses for video-based facial recognition, electronic devices, computer readable storage media, and computer programs.

Embodiments of the present disclosure provide technical solutions of video-based facial recognition.

According to one aspect of the embodiments of the present disclosure, a method for video-based facial recognition is provided, including: forming a face sequence for face images, in a video, that appear in multiple continuous video frames and have positions in the multiple video frames meeting a predetermined displacement requirement, where the face sequence is a set of face images of a same person in the multiple video frames; and performing facial recognition for the face sequence by using a preset face library according to face features in the face sequence.

According to another aspect of the embodiments of the present disclosure, a apparatus for video-based facial recognition is provided. The apparatus includes: a face sequence forming module configured to form a face sequence for face images, in a video, that appear in multiple continuous video frames and have positions in the multiple video frames meeting a predetermined displacement requirement, where the face sequence is a set of face images of a same person in the multiple video frames; and a facial recognition module configured to perform facial recognition for a face sequence by using a preset face library at least according to face features in the face sequence.

An electronic device is provided according to another aspect of the embodiments of the present disclosure, including the apparatus according to any of the embodiments.

An electronic device is provided according to yet another aspect of the embodiments of the present disclosure, including: a memory configured to store a computer program; and a processor configured to execute the computer program stored in the memory, where when the computer program is executed, the method operated according to any of the embodiments is implemented.

A non-transitory computer readable storage medium provided according to yet another aspect of the embodiments of the present disclosure has a computer program stored thereon, where execution of the computer program by a processor causes the processor to implement the following operations of the method as described above.

A computer program provided according to yet another aspect of the embodiments of the present disclosure includes computer instructions, where the computer instructions, when being executed in a processor of a device, causes to implement the method as described above.

According to another aspect of the embodiments of the present disclosure, a apparatus for video-based facial recognition is provided. The apparatus includes: a processor; and a memory for storing instructions executable by the processor, where the processor is configured to: form a face sequence for face images, in a video, that appear in multiple continuous video frames and have positions in the multiple video frames meeting a predetermined displacement requirement, the face sequence being a set of face images of a same person in the multiple video frames; and perform facial recognition for a face sequence by using a preset face library at least according to face features in the face sequence.

On the basis of the methods and apparatuses for video-based facial recognition, electronic devices, computer readable storage mediums, and computer programs provided by the present disclosure, the present disclosure quickly and accurately configures, by forming a face sequence using the property that the faces of a same person have time sequence continuity and spatial position continuity in a video, the faces of the same person continuously appearing in the video into a same face sequence, and thus quickly and accurately recognizes, by performing facial recognition for the face sequence obtained on the basis of the forgoing mode using a face library, whether the person in the video is a human in the face library.

The following further describes in detail the technical solutions of the present disclosure with reference to the accompanying drawings and embodiments.

BRIEF DESCRIPTION OF THE DRAWINGS

The accompanying drawings constituting a part of the specification describe the implementations of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
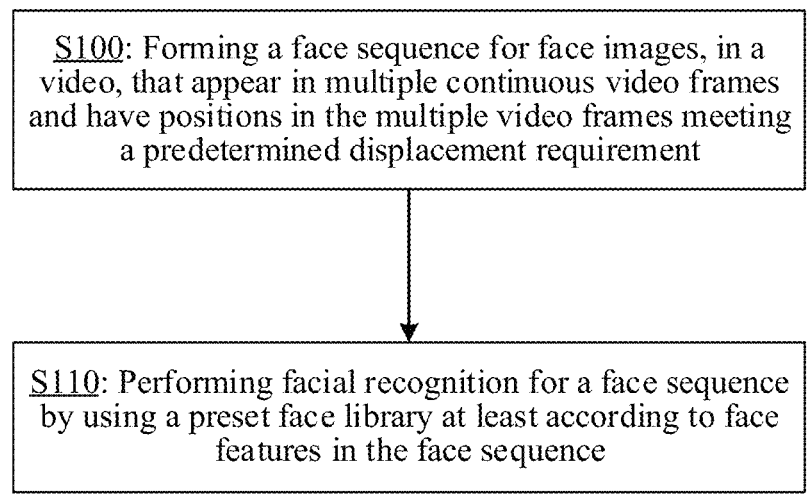
FIG. 1 is a flowchart of an embodiment of a method according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are performed by remote processing devices that are linked through a communications network. In the distributed cloud computing environments, the program modules may be located in local or remote computing system storage media including storage devices.

The inventors of the present disclosure have recognized that, how to quickly and accurately recognize humans in a video is a challenging technical problem.

The technical solutions of video-based facial recognition provided in the present disclosure are described below with reference to FIGS. 1 to 6.

FIG. 1 is a flowchart of an embodiment of a method according to the present disclosure. As shown in FIG. 1, the method according to this embodiment includes: operation S100 and operation S110.

In S100, for face images, in a video, that appear in multiple continuous video frames and have positions in the multiple video frames meeting a predetermined displacement requirement, a face sequence is formed. That is to say, the present disclosure forms at least one face sequence according to the continuity of face images in a video in time sequences and spatial positions. The face sequence is a set of face images of a same person in multiple video frames.

In an example, the video of the present disclosure may be a video based on an RGB form, and may also be a video based on other forms. In addition, the video may be a video based on a real human, and the face in the corresponding face images may be a real face. The video may also be a video based on a drawn human, and the face in the corresponding face may also be a drawn face. For example, the video may be an animation. The present disclosure does not limit the representation of the video.

In an example, the present disclosure obtains face images of a same person in N (N is an integer greater than 2) continuous video frames in the video, and determines a face image pair in the face images of the same person, the displacement from the position in a former video frame to the position in a latter video frame meeting a predetermined displacement requirement. If the intersection over union of the face image pair meeting the predetermined displacement requirement in the face images of the same person meets a preset ratio, the face images of the same person form a face sequence.

In an example, the predetermined displacement requirement of the present disclosure is associated with the preset ratio. If the predetermined displacement requirement is strict (for example, requiring a relatively small displacement distance), the range of the value of the preset ratio is relatively small, and if the preset displacement requirement is less strict (for example, requiring a relatively large displacement distance), the range of the value of the preset ratio is relatively large.

In an example, in the aspect of the continuity of the face images in time sequences and spatial positions, the continuity of the face images in time sequences in the present disclosure usually includes that: the face images of the same person appear in at least two video frames played successively and continuously. The continuity of the face images in spatial positions in the present disclosure usually includes that: the face images of the same person appear at basically the same position in two video frames played successively and continuously. That is to say, in the case that the face images of the same person appear in two successively adjacent video frames and the displacement from the positions of the face images of the same person in a former video frame to the positions of the face images in a latter video frame meets a predetermined displacement requirement, it is considered that the face images have continuity in time sequences and spatial positions. The face images of the same person refer to face images of which the similarity between face features meets a predetermined similarity requirement. The predetermined displacement requirement is set according to actual requirements. For example, when the range of the position in the former video frame is enlarged by a predetermined multiple (such as 1.1-1.5 times), if the position in the latter video frame is located within the range of position enlarged by the predetermined multiple, it is considered that the predetermined displacement requirement is met. In an example, the present disclosure usually forms one or more face sequences according to the continuity of the face images in the video in time sequences and spatial positions. All face images in each face sequence belong to a same person. Each face sequence usually includes one or more face images. In the case that clustering processing is performed on all face sequences in the present disclosure, after the clustering processing, different face sequences correspond to different persons. In the case that no clustering processing is performed on all face sequences in the present disclosure, different face sequences may correspond to the same person. The process of the method for video-based facial recognition comprising face sequence clustering processing is described as below in FIG. 2. By performing clustering processing on face sequences, the present disclosure can quickly and accurately locate all the face images of the same person in the video in one face sequence.

In an example, any face sequence formed in the present disclosure usually includes a face feature of at least one face image, and may also include, on the basis of comprising a face feature of at least one face image, a face key point of the at least one face image. Definitely, the information included in any face sequence formed in the present disclosure may also be another form of information capable of uniquely describing features of face images of a human.

In an example, the present disclosure obtains the face feature and the face key point of the at least one face image in the video frames using existing face feature extraction technology and existing face key point detection technology. For example, the present disclosure may obtain the face feature and the face key point of the at least one face image in the video frames by means of a face detector and a neural network for face feature extraction. In an example, the present disclosure may provide at least one video frame in the video to the face detector, such that the face detector performs face detection on the input video frame. If the face detector detects a face image in the video frame, the face detector outputs bounding box information (such as information about the length, the width, and the central position of a bounding box) of at least one face image it has detected. The present disclosure may segment the corresponding video frame according to the bounding box information to obtain at least one face image block in the corresponding video frame. The at least one face image block is input, after being size-adjusted, to the neural network for face feature extraction, so that the face feature of the at least one face image in the corresponding video frame can be obtained by means of the neural network. Furthermore, the present disclosure may also obtain the face key point of the at least one face image in the video frames by means of the neural network. For example, for one face image in one video frame, 21, or 68, or 106, or 186, or 240, or 220, or 274 face key points may be obtained. The present disclosure may obtain the face feature and the face key point using an existing neural network. The network structure of the neural network may be flexibly designed according to actual requirements. The present disclosure does not limit the network structure of the neural network. For example, the neural network includes, but not limited to, a convolutional layer, a non-linear Relu layer, a pooling layer, and a fully connected layer, and the more the network layers, the deeper the network. For another example, the network structure of the neural network is, but not limited to, a structure of a network such as an ALexNet, a Deep Residual Network (ResNet), or a Visual Geometry Group Network (VGGnet). The present disclosure does not limit the implementation for obtaining the face feature and the face key point of the at least one face image in the video frames. In an example, the process of forming face sequences of the present disclosure usually includes: creating face sequences and determining the face sequence to which the face images in the video frames belong.

An example of the creating face sequences is: when a video frame in which a face appears for the first time in the video is detected, respectively creating face sequences for one or more of the at least one face image in the video frame. For example, if it is detected that no face image appears in the first to fourth video frames in the video, and three face images, i.e., a first face image, a second face image, and a third face image, start to appear in the fifth video frame, the present disclosure respectively create face sequences, i.e., a first face sequence, a second face sequence, and a third face sequence, for the three face images. The first face sequence includes the face feature and the face key point of the first face image, the second face sequence includes the face feature and the face key point of the second face image, and the third face sequence includes the face feature and the face key point of the third face image.

Another example of the creating face sequences is: if at least one face image that does not appear in a former video frame but appears in a latter video frame is detected, respectively creating face sequences for such detected one or more face images. With the former example, if it is detected that five face images, i.e., the first face image, the second face image, the third face image, a fourth face image, and a fifth face image, appear in the sixth video frame, the present disclosure respectively create face sequences, i.e., a fourth face sequence and a fifth face sequence, for the fourth face image and the fifth face image. The fourth face sequence includes the face feature and the face key point of the first face image, and the fifth face sequence includes the face feature and the face key point of the fifth face image. Continuing with the former example, if it is detected that three face images, i.e., the first face image, the second face image, and a fourth face image, appear in the sixth video frame, the present disclosure creates a face sequence, i.e., a fourth face sequence, for the fourth face image. The fourth face sequence includes the face feature and the face key point of the fourth face image.

An example of the determining the face sequence to which the face images in the video frame belong is: incorporating face images of the same person appearing in the former video frame and the latter video frame and having continuous spatial positions, into the face sequence of the same person. With the former example, if it is detected that five face images, i.e., the first face image, the second face image, the third face image, a fourth face image, and a fifth face image, appear in the sixth video frame, the present disclosure incorporates the first face image appearing in the sixth video frame and having an appearance position continuous with that in the fifth video frame into the first face sequence, the second face image appearing in the sixth video frame and having an appearance position continuous with that in the fifth video frame into the second face sequence, and the third face image appearing in the sixth video frame and having an appearance position continuous with that in the fifth video frame into the third face sequence. For example, the present disclosure adds the face feature and the face key point of the first face image appearing in the sixth video frame and having an appearance position continuous with that in the fifth video frame to the first face sequence, the face feature and the face key point of the second face image appearing in the sixth video frame and having an appearance position continuous with that in the fifth video frame to the second face sequence, and the face feature and the face key point of the third face image appearing in the sixth video frame and having an appearance position continuous with that in the fifth video frame to the third face sequence. Continuing with the former example, if it is detected that three face images, i.e., the first face image, the second face image, and a fourth face image, appear in the sixth video frame, the present disclosure incorporates the first face image appearing in the sixth video frame and having an appearance position continuous with that in the fifth video frame into the first face sequence, and the second face image appearing in the sixth video frame and having an appearance position continuous with that in the fifth video frame into the second face sequence. For example, the present disclosure adds the face feature and the face key point of the first face image in the sixth video frame to the first face sequence, and the face feature and the face key point of the second face image in the sixth video frame to the second face sequence.

In an example, during the process of determining the face sequence to which the face images in the video frames belong, the present disclosure needs to incorporate the face images of the same person appearing in the former video frame and the latter video frame and having continuous spatial positions into the face sequence of the same person. An example of the implementation of the incorporating into the face sequence of the same person is: for any two successively adjacent video frames in the video, first respectively obtaining the face feature of at least one face image in the former video frame, the position in the former video frame of the at least one face image in the former video frame, the face feature of at least one face image in the latter video frame, and the position in the latter video frame of the at least one face image in the latter video frame; then determining, according to the position in the former video frame of the at least one face image in the former video frame and the position in the latter video frame of the at least one face image in the latter video frame, a face image pair having displacement meeting a predetermined displacement requirement; if no face image pair having displacement meeting a predetermined displacement requirement exists, determining that it is required to create a new face sequence for the face image of the face image pair in the latter video frame; if a face image pair having displacement meeting a predetermined displacement requirement exists, for each face image pair, determining whether the similarity of the face feature pair of the face image pair meets a predetermined similarity requirement; if the predetermined similarity requirement is met, determining that the face image of the face image pair in the latter video frame belongs to the face sequence to which the face image in the former video frame belongs; and if the predetermined similarity requirement is not met, determining that it is required to create a new face sequence for the face image of the face image pair in the latter video frame.

The mode for forming face sequences of the present disclosure can quickly and accurately incorporate at least one face image in at least one video frame of a video into a corresponding face sequence, and facilitates improving the efficiency and accuracy of facial recognition. For an optional implementation process of forming face sequences of the present disclosure, please refer to the description below for FIG. 4.

In an example, the operation S100 may be performed by a processor by invoking a corresponding instruction stored in a memory, and may also be performed by a face sequence forming module 500 run by the processor.

In S110, facial recognition is performed for a face sequence by using a preset face library at least according to face features in the face sequence.

In an example, the present disclosure performs facial recognition, using a preset face library, according to face features of a face sequence and face features of at least some face images in the face sequence. That is to say, the face sequence of the present disclosure has face features, and the face features of the face sequence are usually face features obtained by means of comprehensive consideration of the face features of at least some face images in the face sequence. For example, the face features of the at least some face images in the face sequence respectively correspond to weight values (i.e., the at least some face images respectively correspond to weight values). By performing, using at least some weight values, weighing computation on the face features of the at least some face images in the face sequence, a weighted average value of the face features of the at least some face images can be obtained. The present disclosure uses the weighted average value as a face feature of the face sequence. The face features of the face sequence of the present disclosure are also referred to as comprehensive face features of the face sequence.

According to one or more embodiments of the present application, the present disclosure determines, according to the face image quality of the at least some face images in the face sequence, the weight values respectively corresponding to the face features of the at least some face images in the face sequence. The face image quality of the present disclosure includes: one or more of the face image light intensity, face image definition, and face orientation, where the face orientation is obtained on the basis of a face key point. For example, the present disclosure computes a face key point using an existing computation method, so as to obtain a face orientation.

Generally, the higher the face image quality, the greater the weight value corresponding to the face image, and the lower the face image quality, the smaller the weight value corresponding to the face image. For example, the higher the face image definition, the more suitable the face image light intensity, and the smaller the angle of the face orientation (i.e., more approximate to the front face), the greater the weight value corresponding to the face image, and the lower the face image definition, the higher or lower the face image light intensity, and the greater the angle of the face orientation (i.e., the greater the angle of deviation from the front face), the smaller the weight value corresponding to the face image. In the case that the face image quality includes the face image light intensity, face image definition, and face orientation, the ratio of the weight values of the three can be determined according to actual situations. The present disclosure does not limit the association relationship between face image quality and weight values. In addition, the present disclosure estimates the face image quality of the at least some face images in the face sequence using the prior art. The present disclosure does not limit the implementation of estimating the face image quality. Furthermore, the present disclosure also obtains the face features of the face sequence by means of other modes apart from weighted averaging. For example, by performing averaging computation on the face features of the at least some face images in the face sequence, an average face feature based on at least some faces can be obtained. The present disclosure uses the average face feature as a face feature of the face sequence. The present disclosure does not limit the implementation of determining the face features of the face sequence according to at least some face features of the face sequence.

By setting weight values according to face image quality and forming faces features of a face sequence using the weight values, the present disclosure avoids adverse effects of low quality face features of the face sequence on facial recognition. For example, if the low quality face features are completely ignored during the determination of a theme character of a video, the accuracy of the determination of the theme character may be affected. For another example, if the low quality face features and the high quality face features are equally treated, the description accuracy of the face features of the face sequence may be affected.

In an example, no matter whether the face sequences in the operation are face sequences subjected to the clustering processing, for any face sequence of all the face sequences, the present disclosure performs facial recognition, using the preset face library, according to the face features of the face sequence and the face features of at least some face images in the face sequence, e.g., recognizing the person to which the face belongs and the confidence that the face belongs to the person. In an example, for any face sequence of all the face sequences, the present disclosure determines, according to the face features of the face sequence and the face features of at least some face images in the face sequence, the confidence that the person corresponding to the face sequence is a human in the preset face library, and thus determines, according to the confidence, whether the person corresponding to the face sequence is a human in the face library. The present disclosure may determine, for each face sequence, whether the person corresponding to the face sequence is a human in the face library. The present disclosure may also determine, merely for some face sequences, whether the persons corresponding to the face sequences are humans in the face library. The present disclosure may further determine, for the face sequence including the maximum number of face images, whether the person corresponding to the face sequence is a human in the face library.

An example is as follows.

First, the present disclosure presets a face library, the face library including face features of multiple persons. For each human in the face library, the face feature of the person in the face library usually includes two parts of contents, where one part is the comprehensive face feature of the person, and the other part is the face features in different pictures (such as photos or video frames) of the person. The comprehensive face feature is usually a face feature obtained by means of comprehensive consideration of the face features in different pictures of the person. For example, the face features of faces in different pictures of the person respectively correspond to weight values. By performing, using the weight values, weighting computation on the face features of the faces in the different pictures of the person, a weighted average value based on the face features of the faces in the different pictures of the person can be obtained. The present disclosure uses the weighted average value as the comprehensive face feature of the person in the face library. According to one or more embodiments of the present application, the present disclosure determines, according to the face image quality of the faces in the different pictures, the weight values respectively corresponding to the face features of the faces in the different pictures. The face image quality includes: one or more of the face image light intensity, face image definition, and face orientation. Generally, the higher the face image quality, the greater the weight value corresponding to the face image, and the lower the face image quality, the smaller the weight value corresponding to the face image. The present disclosure does not limit the association relationship between face image quality and weight values. In addition, the present disclosure estimates the face image quality of the faces, in the face library, in the different pictures using the prior art. The present disclosure does not limit the implementation of estimating the face image quality. Furthermore, the present disclosure also obtains the comprehensive face features of the persons in the face library by means of other modes apart from weighted averaging. For example, by performing averaging computation on the face features of the face in the different pictures of a human in the face library, an average face feature based on the person can be obtained. The present disclosure uses the average face feature as the comprehensive face feature of the person in the face library. The present disclosure does not limit the implementation of determining the comprehensive face feature of any person in the face library. Furthermore, the face library of the present disclosure further includes face key points of the faces in different pictures. According to one or more embodiments of the present application, the method for determining the comprehensive face feature is the same as the method for determining the face features of the face sequence.

Second, for a face sequence (for example, for any face sequence or the face sequence including the maximum number of face images), the similarity between at least one face feature (for example, all face features) of the face sequence and the comprehensive face feature of at least one human in the face library is computed, and the highest similarity is selected for the at least one face feature (such as each face feature) of the face sequence, such that voting is performed using the person in the face library corresponding to the highest similarity. The present disclosure determines, according to the voting result, the person to which the face sequence belongs. In an example, for any face sequence of all the face sequences, the similarities between the first face feature of the face sequence and the comprehensive face feature of the first human in the face library, the comprehensive face feature of the second human in the face library . . . and the comprehensive face feature of the last human (for example, the Nth human) in the face library are computed to obtain N similarities, and the highest similarity is selected from the N similarities; the similarities between the second face feature of the face sequence and the comprehensive face feature of the first human in the face library, the comprehensive face feature of the second human in the face library . . . and the comprehensive face feature of the last human in the face library are computed to obtain another N similarities, and the highest similarity is selected from the N similarities; and so forth, the similarities between the M-th (for example, the last) face feature of the face sequence and the comprehensive face feature of the first human in the face library, the comprehensive face feature of the second human in the face library . . . and the comprehensive face feature of the last human in the face library are computed to obtain N similarities, and the highest similarity is selected from the N similarities. Therefore, the present disclosure obtains M highest similarities. The present disclosure votes for the persons in the face library corresponding to the M highest similarities. For example, if M−1 (M>2) highest similarities all correspond to the first human in the face library, and only one highest similarity corresponds the second human in the face library, the present disclosure determines, according to the voting result, that the face sequence belongs to the first human in the face library. The present disclosure does not limit the implementation for computing the similarities between the face features of the face sequence and the comprehensive face features.

Next, the present disclosure determines, according to at least one face feature of the face sequence and the face features of the face in different pictures of the person, in the face library to which the face sequence belongs, the confidence that the face sequence belongs to the person in the face library. In an example, for ease of description, the present disclosure regards the face features of the face in different pictures of the person, in the face library to which the face sequence belongs, as a face feature set. For the face feature of each face image in the face sequence, the present disclosure searches the face feature set for face feature having the most similar face pose to the face feature, respectively. One face feature of the face sequence and the face feature having the most similar face pose to the face feature form a face feature pair, and the similarity (for example, the confidence) between the two face features in the face feature pair is computed, such that the present disclosure respectively obtains similarities for one or more face features of the face sequence. Therefore, the present disclosure determines, according to all similarities computed for the face sequence, the confidence that the face sequence belongs to the person in the face library. In addition, the present disclosure corrects the confidence using the face features of the face sequence. In an example, the present disclosure computes the similarity between the face feature of the face sequence and the comprehensive face feature of the person in the face library to which the face sequence belongs, when determining that the similarity is less than the confidence, uses the similarity as the confidence that the face sequence belongs the person in the face library, and when determining that the similarity is not less than the confidence, does not update the confidence that the face sequence belongs to the person in the face library using the similarity.

By determining the confidence using at least one face feature of the face sequence and the face feature in the face feature set having the most similar face pose to the face feature, the present disclosure avoids the influence of a pose difference of a face on the computation accuracy of the confidence. By computing the similarity between the face feature of the face sequence and the comprehensive face feature of the person in the face library to which the face sequence belongs and correcting the determined confidence using the similarity, the present disclosure avoids the error occurred when determining whether the face sequence belongs to a human in the face library due to excessively monotonous face orientation of the faces (for example, the faces are all faces facing leftwards) in the face sequence, thereby facilitating improving the accuracy of facial recognition.

In an example, the present disclosure determines the feature of a face using a face key point, thereby determining the face feature in the face feature set having the most similar face pose in the face sequence. For example, the face sequence includes face features and the face key points (hereafter referred to as first face key points) of faces, and the face library includes face features and face key points in different pictures of humans (hereafter referred to as second face key points). The present disclosure maps the first face key point of one face in the face sequence to a standard blank image, and also respectively maps the second face key points in different pictures of the persons, in the face library, to the standard blank image, so that by comparing the positional relationship between at least one key point in the first face key point and at least one key point in at least one second face key point, the face feature having the most similar pose can be selected from the face feature set according to the comparison result. The face pose of the present disclosure usually shows a face orientation, a facial expression, etc. The face pose is usually determined by face key points. The present disclosure regards the face pose as the physical meaning of the face key points.

The present disclosure determines, according to the finally determined confidence, whether any face in the video belongs to the corresponding human in the face library. The determination result of the present disclosure is applied to multiple applications, such as determining a theme character of a video, determining all characters in the video, or determining a video associated with a given character.

Therefore, the present disclosure implements automatic management of videos.

In an example, the operation S110 may be performed by a processor by invoking a corresponding instruction stored in a memory, and may also be performed by a facial recognition module 510 run by the processor.

Figure 2:
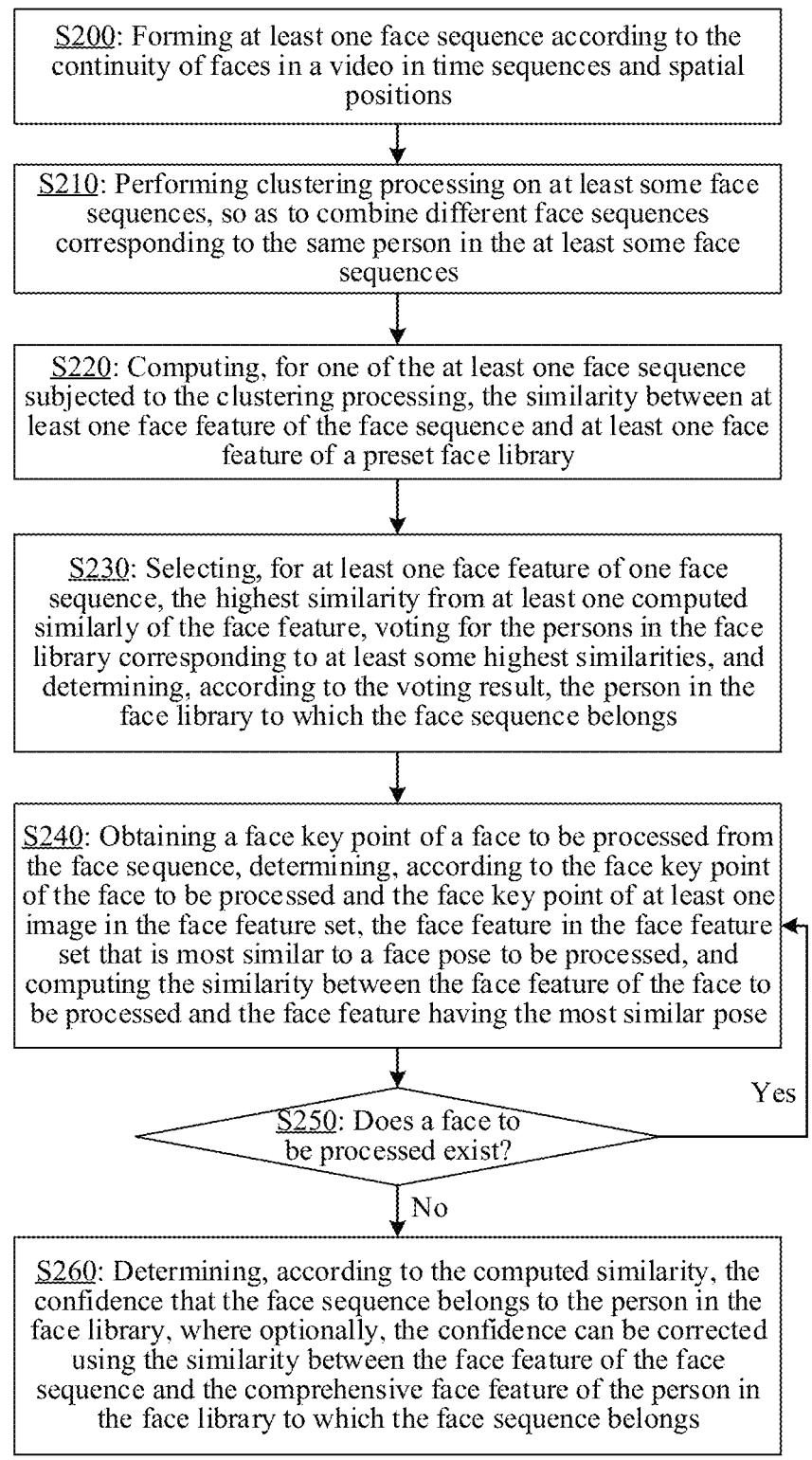
FIG. 2 is a flowchart of another embodiment of the method according to the present disclosure.

FIG. 2 is a flowchart of another embodiment of the method according to the present disclosure. As shown in FIG. 2, the method of the embodiment mainly includes: operation S200, operation S210, operation S220, operation S230, operation S240, operation S250, and operation S260.

In S200, a face sequence is formed for face images, in a video, that appear in multiple continuous video frames and have positions in the multiple video frames meeting a predetermined displacement requirement. That is to say, the present disclosure forms at least one face sequence according to the continuity of faces in a video in time sequences and spatial positions.

In an example, each face sequence has a face feature, and the face feature is the face feature of the face sequence. In addition, each face sequence usually includes face features of one or more face images. All the face features of each face sequence belong to a same person.

In an example, the operation S200 may be performed by a processor by invoking a corresponding instruction stored in a memory, and may also be performed by a face sequence forming module 500 run by the processor.

In S210, clustering processing is performed on at least some face sequences, so as to combine different face sequences corresponding to the same person in the at least some face sequences.

Figure 3:
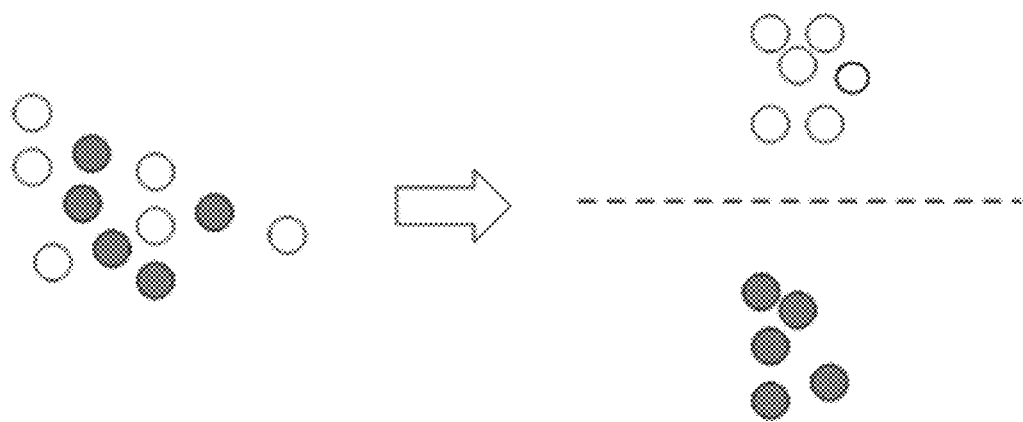
FIG. 3 is a schematic diagram of an embodiment of face sequence clustering processing of the present disclosure.

As shown in FIG. 3, each circle represents a face sequence. The faces of a first main character and a second main character in the video form 11 face sequences, as the 11 circle on the left side of FIG. 3, due the interruption of the faces in time sequences or spatial positions. The 11 face sequences are classified into two categories during the clustering processing, i.e., a category formed by the 6 face sequences on the upper right of FIG. 3 and the other category formed by the 5 face sequences on the lower right of FIG. 3. The present disclosure combines the 6 face sequences on the upper right of FIG. 3 into one face sequence and combines the 5 face sequences on the lower right of FIG. 3 into the other face sequence.

In an example, the present disclosure performs clustering processing according to the face features of at least some face sequences. The present disclosure does not limit the implementation of clustering processing. After the clustering processing, the combined face sequences also have face features. The face features may be computed on the basis weight values by means of all face features of the at least some face sequences that are combined, and may also be computed by means of the face features of the at least some face sequences that are combined. The combined face sequences include all the face features of the at least some face sequences that are combined. In an example, the operation S210 may be performed by a processor by invoking a corresponding instruction stored in a memory, and may also be performed by a face sequence clustering module 530 run by the processor.

In S220, for one of the at least one face sequence subjected to the clustering processing, the similarity between at least one face feature of the face sequence and at least one face feature of a preset face library is computed.

In an example, the present disclosure selects, from all face sequences subjected to the clustering processing, the face sequence including the maximum number of faces, and computes the similarities between at least some face features of the selected face sequence and the face features of at least some humans in the preset face library, respectively.

In S230, for at least one face feature of one face sequence, the highest similarity is selected from at least one computed similarly of the face feature, voting is performed for the persons in the face library corresponding to at least some highest similarities, and the person in the face library to which the face sequence belongs is determined according to the voting result. All pictures in the face library of the person in the face library to which the face sequence belongs form a face feature set.

In S240, a face key point of a face to be processed is obtained from the face sequence; the face feature in the face feature set having the most similar face pose to be processed is determined according to the face key point of the face to be processed and the face key point of at least one image in the face feature set; and the similarity between the face feature of the face to be processed and the face feature having the most similar pose is computed.

In S250, whether a face to be processed still exists in the face sequence is determined; if a face to be processed still exists, operation S240 is performed; otherwise, operation S260 is performed.

In S260, the confidence that the face sequence belongs to the person in the face library is determined according to the computed similarity. For example, an average value of all similarities is computed, and the average value is used as the confidence. In addition, the present disclosure also computes the similarity between the face feature of the face sequence and the comprehensive face feature of the person in the face library to which the face sequence belongs and determines the size relationship between the similarity and the confidence. If the similarity is less than the confidence, the similarity is used as the confidence that the face sequence belongs to the person in the face library; otherwise, no correction is performed on the determined confidence.

In an example, the operations S220, S230, S240, S250, and S260 may be performed by a processor by invoking a corresponding instruction stored in a memory, and may also be performed by a facial recognition module 520 run by the processor.

Figure 4:
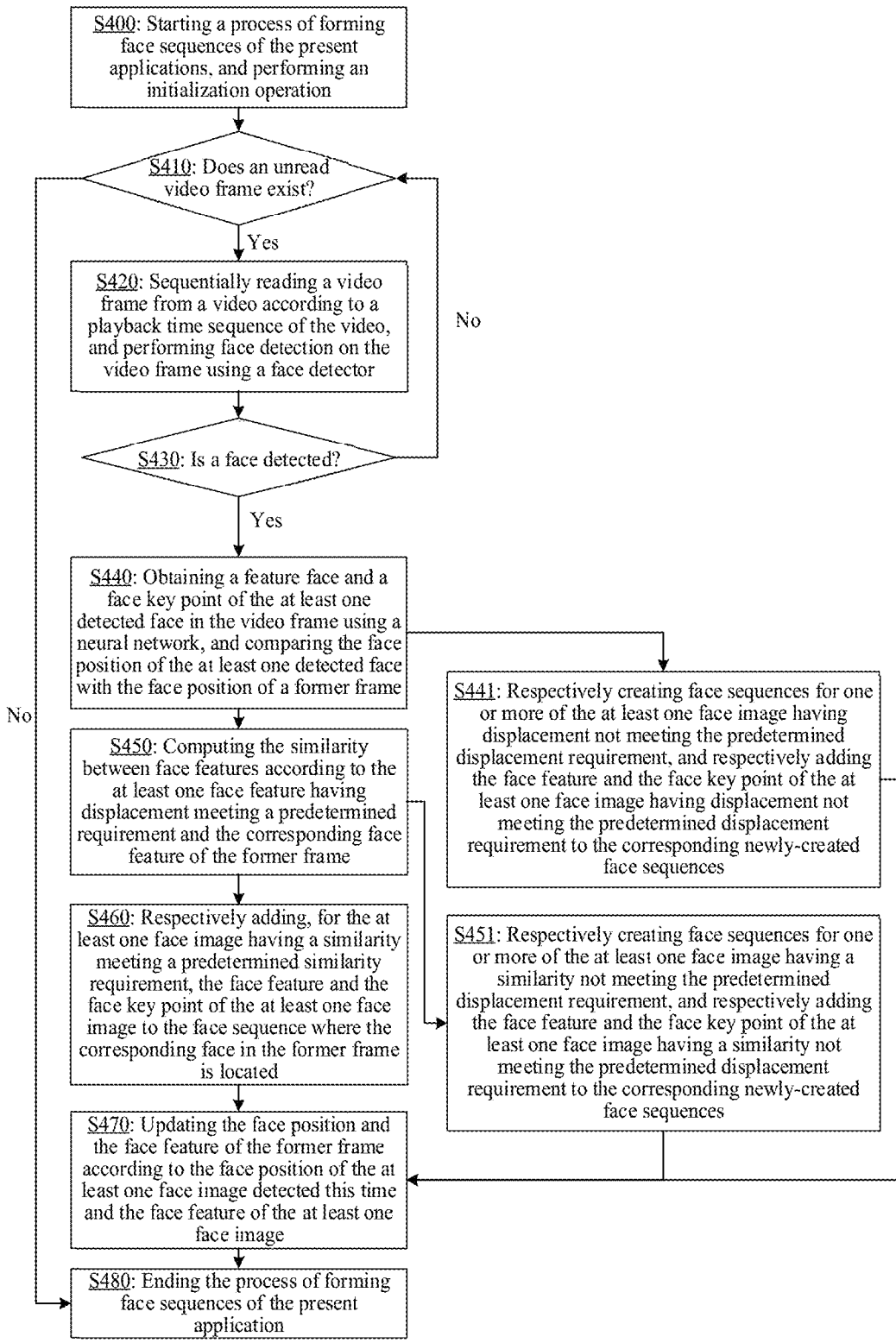
FIG. 4 is a flowchart of an embodiment of face sequence forming according to the present disclosure.

FIG. 4 is a flowchart of an embodiment of face sequence forming according to the present disclosure. As shown in FIG. 4, the method of this embodiment includes the following operations:

In S400, a process of forming face sequences of the present disclosure starts, and an initialization operation is performed to initialize a face position and a face feature of a previous frame. For example, the face position and the face feature of the previous frame are respectively initialized to null.

In S410, whether an unread video frame currently exists in a video is determined. If an unread video frame currently exists, operation S420 is performed. If no unread video frame currently exists, operation S480 is performed.

In S420, a video frame is sequentially read from the video according to a playback time sequence of the video, and face detection is performed on the video frame using a face detector.

In S430, whether a face image is detected is determined. If a face image is detected, operation S440 is performed. If not face image is detected, the operation S410 is performed again.

In S440, a face feature and a face key point of the detected at least one face image in the video frame is obtained using a neural network, and the face position of the detected at least one face image is compared with the face position of the previous frame. For the at least one face image detected this time and having displacement meeting a predetermined displacement requirement, processing corresponding to operation S450 is performed. For the at least one face image detected this time and having displacement not meeting the predetermined displacement requirement, processing corresponding to operation S441 is performed.

In S441, for one or more of the at least one face image having displacement not meeting the predetermined displacement requirement, face sequences are respectively created, and the face feature and the face key point of the at least one face image having displacement not meeting the predetermined displacement requirement are respectively added to the corresponding newly-created face sequences. Operation S460 is performed.

In S450, the similarity between face features is computed according to the at least one face feature having displacement meeting the predetermined requirement and the corresponding face feature of the previous frame. For the face image having a similarity meeting a predetermined similarity requirement, processing corresponding to operation S460 is performed. For the face image having a similarity not meeting the predetermined similarity requirement, processing corresponding to operation S451 is performed.

In S451, for one or more of the at least one face image having a similarity not meeting the predetermined displacement requirement, face sequences are respectively created, and the face feature and the face key point of the at least one face image having a similarity not meeting the predetermined displacement requirement are respectively added to the corresponding newly-created face sequences. Operation S470 is performed.

In S460, for the at least one face image having a similarity meeting the predetermined similarity requirement, the face feature and the face key point of the at least one face image are respectively added to the face sequence where the corresponding face in the previous frame is located. Operation S470 is performed.

In S470, the face position and the face feature of the previous frame are updated according to the face position of the at least one face image detected this time and the face feature of the at least one face image. Operation S410 is performed again.

In S480, the process of forming face sequences of the present disclosure ends.

Any method for video-based facial recognition provided in the embodiments of the present disclosure may be executed by any appropriate device having a data processing capability, including, but not limited to, a terminal and a server, etc. Alternatively, any method for video-based facial recognition provided in the embodiments of the present disclosure may be executed by a processor, for example, any method for video-based facial recognition mentioned in the embodiments of the present disclosure is executed by the processor by invoking corresponding instructions stored in a memory. Details are not described below again.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes various media capable of storing a program code such as an ROM, an RAM, a magnetic disk, or an optical disk.

Figure 5:
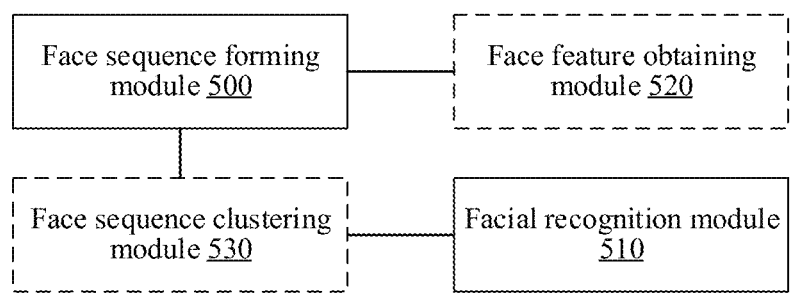
FIG. 5 is a schematic structural diagram of an embodiment of an apparatus of the present disclosure.

FIG. 5 is a schematic structural diagram of an embodiment of an apparatus of the present disclosure. As shown in FIG. 5, the apparatus of the embodiment mainly includes: a face sequence forming module 500 and a facial recognition module 510. According to one or more embodiments of the present application, the apparatus further includes at least one of a face feature obtaining module 520 and a face sequence clustering module 530.

The face sequence forming module 500 is mainly configured to form a face sequence for face images, in a video, that appear in multiple continuous video frames and have positions in the multiple video frames meeting a predetermined displacement requirement, where the face sequence is a set of face images of a same person in multiple video frames.

According to one or more embodiments of the present application, the face sequence forming module 500 obtains face images of a same person in N (N is an integer greater than 2) continuous video frames of the video, and determines a face image pair in the face images of the same person, the displacement from the position in a former video frame to the position in a latter video frame meeting a predetermined displacement requirement. If the intersection over union of the face image pair meeting the predetermined displacement requirement in the face images of the same person meets a preset ratio, the face sequence forming module 500 forms the face images of the same person into a face sequence.

According to one or more embodiments of the present application, if the face images of the same person appear in successively adjacent video frames, and the displacement from the positions of the face images of the same person in the former video frame to the positions of the face images of the same person in the latter video frame meets a predetermined displacement requirement, the face sequence forming module 500 sets such face images in a same face sequence.

The face images of the same person include face images of which the similarity between face features meets a predetermined similarity requirement.

In an example, the face sequence forming module 500 respectively creates face sequences for one or more of the at least one face image in the video frame in which a face appears for the first time in the video. The face sequence forming module 500 respectively creates face sequences for one or more of the at least one face image that does not appear in a former video frame but appears in a latter video frame. The face sequence forming module 500 also incorporates face images of the same person appearing in the former video frame and the latter video frame and having continuous spatial positions, into the face sequence of the same person.

In an example, the face sequence forming module 500 respectively obtains the face feature of at least one face image in the former video frame of successively adjacent video frames, the position in the former video frame of the at least one face image in the former video frame, the face feature of at least one face image in the latter video frame, and the position in the latter video frame of the at least one face image in the latter video frame. The face sequence forming module 500 determines, according to the position in the former video frame of the at least one face image in the former video frame and the position in the latter video frame of the at least one face image in the latter video frame, a face image pair having displacement meeting a predetermined displacement requirement. For the face image pair having displacement meeting the predetermined displacement requirement, in the case that it is determined that the similarity of the face feature pair of the face image pair meets a predetermined similarity requirement, the face sequence forming module 500 determines that the face image of the face image pair in the latter video frame belongs to the face sequence to which the face image in the former video frame belongs.

In an example, for the face image pair having displacement meeting the predetermined displacement requirement, in the case that it is determined that the similarity of the face feature pair of the face image pair does not meet a predetermined similarity requirement, the face sequence forming module 500 creates a face sequence for the face image of the face image pair in the latter video frame.

The face feature used by the face sequence forming module 500 is provided by the face feature obtaining module 520. The face feature obtaining module 520 is mainly configured to perform face detection on the video frame using a face detector to obtain bounding box information of at least one face image in the video frame, and provide the video frame and the bounding box information of the at least one face image in the video frame to a neural network for face feature extraction, such that the face feature of the at least one face image in the video frame is obtained by means of the neural network. The face feature obtaining module 520 also obtains the face key point of the at least one face image in the video frame by means of the neural network.

The facial recognition module 510 is mainly configured to perform facial recognition for a face sequence by using a preset face library at least according to face features in the face sequence.

In an example, the face library of the present disclosure includes face features of multiple persons, and for any person, the face features of the person include the comprehensive face feature of the person and the face features in different pictures of the person. The comprehensive face feature includes a weighted average value of the face features in different pictures of the person.

In an example, first, the facial recognition module 510 computes, for at least one face feature of a face sequence, the similarity between the face feature and the comprehensive face feature of at least one human in the face library, and determines the persons in the face library corresponding to the highest similarities; second, the facial recognition module 510 votes for the persons in the face library corresponding to the highest similarities determined according to at least some face features of the face sequence; then, for the face sequence, the facial recognition module 510 determines, at least according to the similarities between at least one face feature of the face sequence and the face features of the person, in the face library to which the face sequence belongs, in different pictures, the confidence that the face sequence belongs to the person. For example, the facial recognition module 510 computes, for the at least one face feature of the face sequence, the similarity between the face feature and the face feature in the face feature set having the most similar face pose to the face feature, and determines, according to the computed similarity between the face feature and the face feature in the face feature set having the most similar face pose to the face feature, the confidence that the face sequence belongs to the person, where the face feature set includes the face features in different pictures of the person in the face library.

In addition, the facial recognition module 510 determines, according to the face key points of the face sequence and the face key points in the face feature set, the face feature in the face feature set having the most similar face pose in the face sequence. Furthermore, the facial recognition module 510 corrects the confidence that the face sequence belongs to the person using the similarity between the face feature of the face sequence and the comprehensive face feature of the person to which the face sequence belongs.

The face sequence clustering module 530 is mainly configured to perform clustering processing on at least some face sequences according to the face features of the at least some face sequences, so as to combine different face sequences corresponding to a same person, where after the clustering processing, different face sequences correspond to different persons, and the face sequences subjected to the clustering processing are provided to the facial recognition module 510. The face feature of the face sequence of the present disclosure is a weighted average value of the face features of at least some face images in the face sequence. The weight values of the face features of the at least some face images in the face sequence are determined according to the face image quality of the at least some face images. The face image quality includes at least one of the face image light intensity, face image definition, and face orientation.

Exemplary Devices

Figure 6:
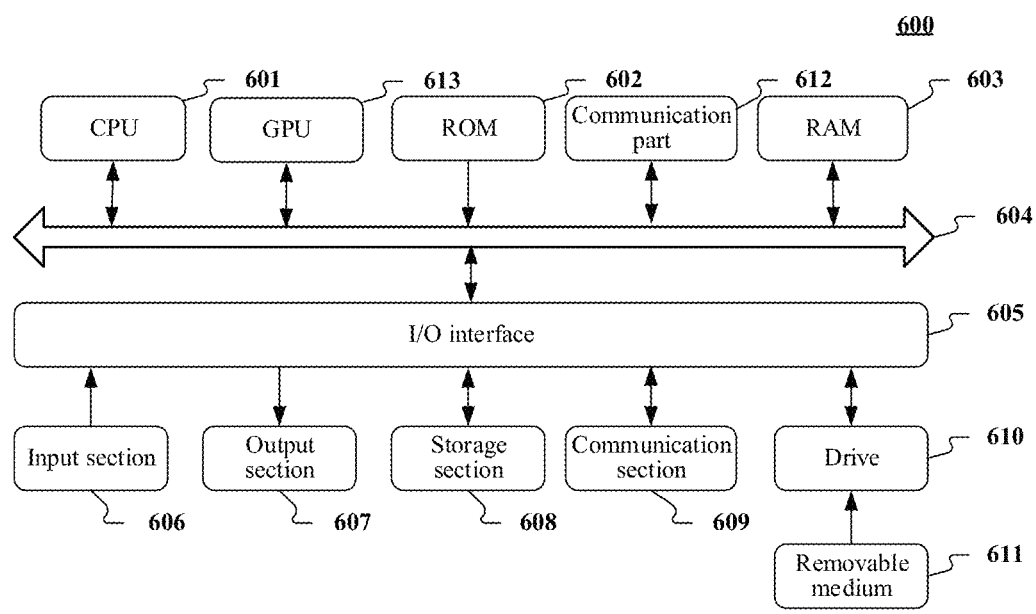
FIG. 6 is a block diagram of an exemplary device according to embodiments of the present disclosure.

FIG. 6 illustrates an exemplary device 600 suitable for implementing the present disclosure. The device 600 is a control system/electronic system configured in an automobile, a mobile terminal (such as a smart mobile phone), a PC (such as a desktop computer or a notebook computer), a tablet computer, or a server. In FIG. 6, the device 600 includes one or more processors, a communication part, and the like. The one or more processors are one or more Central Processing Units (CPUs) 601 and/or one or more video-based facial recognizers (GPUs) 613, and the processors perform various appropriate actions and processing according to executable instructions stored in a Read-Only Memory (ROM) 602 or executable instructions loaded from a storage section 608 to a Random Access Memory (RAM) 603. The communication part 612 includes, but not limited to, a network interface card. The network interface card includes, but not limited to, an Infiniband (IB) network interface card. The processor communicates with the ROM 602 and/or the RAM 630 to execute the executable instructions. The processor is connected to the communication part 604 via a bus 612, and communicates with other target devices via the communication part 612, thereby implementing corresponding operations in the present disclosure.

Reference is made to related descriptions in the foregoing method embodiments for the operations executed by the instructions. Descriptions are not made herein in detail.

In addition, the RAM 603 further stores various programs and data required for operations of an apparatus. The CPU 601, the ROM 602, and the RAM 603 are connected to each other by means of the bus 604. In the presence of the RAM 603, the ROM 602 is an optional module. The RAM 603 stores executable instructions, or writes the executable instructions into the ROM 602 during running, where the executable instructions cause the CPU 601 to execute operations included in the method for video-based facial recognition. An Input/Output (I/O) interface 605 is also connected to the bus 604. The communication part 612 may be configured integrally, and may also be configured to have multiple sub-modules (for example, multiple IB network interface cards) separately connected to the bus.

The following components are connected to the I/O interface 605: an input section 606 including a keyboard, a mouse and the like; an output section 607 including a Cathode-Ray Tube (CRT), a Liquid Crystal Display (LCD), a speaker and the like; the storage section 608 including a hard disk drive and the like; and a communication section 609 of a network interface card including an LAN card, a modem and the like. The communication section 609 performs communication processing via a network such as the Internet. A drive 610 is also connected to the I/O interface 605 according to requirements. A removable medium 611 such as a magnetic disk, an optical disk, a magneto-optical disk, a semiconductor memory is installed on the drive 610 according to requirements, so that a computer program read from the removable medium is installed on the storage section 608 according to requirements.

It should be particularly noted that, the architecture illustrated in FIG. 6 is merely an optional implementation. During practice, the number and types of the components in FIG. 6 may be selected, decreased, increased, or replaced according to actual requirements. Different functional components may be configured separately or integrally or the like. For example, the GPU and the CPU may be configured separately. For another example, the GPU may be integrated on the CPU, and the communication part may be configured separately, and may also be configured integrally on the CPU or the GPU or the like. These alternative implementations all fall within the scope of protection of the present disclosure.

Particularly, a process described below with reference to the flowchart according to the embodiments of the present disclosure may be implemented as a computer software program. For example, the embodiments of present disclosure include a computer program product. The computer program product includes a computer program tangibly included in a machine-readable medium. The computer program includes a program code for performing the operations shown in the flowchart. The program code may include instructions for correspondingly performing the operations provided in the present disclosure, such as an instruction for forming a face sequence for face images, in a video, appearing in multiple continuous video frames and having positions in the multiple video frames meeting a predetermined displacement requirement, where the face sequence is a set of face images of a same person in the multiple video frames, and an instruction for performing facial recognition for the face sequence by using a preset face library at least according to the face features of the face sequence.

In such implementations, the computer program is downloaded and installed from the network through the communication section 609, and/or is installed from the removable medium 611. The computer program, when being executed by the CPU 601, executes the foregoing instructions described in the present disclosure.

The methods, apparatuses, electronic devices, and computer-readable storage media according to the present disclosure may be implemented in many manners. For example, the methods, apparatuses, electronic devices and computer-readable storage media according to the present disclosure may be implemented by using software, hardware, firmware, or any combination of software, hardware, and firmware. The foregoing sequence of the operations of the method is merely for description, and unless otherwise stated particularly, the operations of the method in the present disclosure are not limited to the specifically described sequence. In addition, in some implementations, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for video-based facial recognition, comprising:
for face images of a same person, in a video, that appear in multiple continuous video frames, determining that positions of the face images of the same person in the multiple video frames meet a predetermined displacement requirement, and forming the face images into a face sequence, wherein the face sequence is a set of face images of the same person in the multiple video frames; and
performing facial recognition for the face sequence by using a preset face library according to face features in the face sequence,
wherein said determining that positions of the face images of the same person in the multiple video frames meet a predetermined displacement requirement, and forming the face images into a face sequence comprises:
obtaining the face images of the same person in N continuous video frames of the video, N being an integer greater than two;
determining, in the face images of the same person, a face image pair that a displacement from a position of a face image in a former video frame to a position of the face image in a latter video frame meets the predetermined displacement requirement; and
in a case that an intersection over union of the face image pair meets the predetermined displacement requirement with the face images of the same person satisfies a preset ratio, forming the face images into the face sequence.

2. The method according to claim 1, wherein the face images of the same person comprise face images of which the similarity between face features meets a predetermined similarity requirement.

3. The method according to claim 1, wherein for face images of a same person, in a video, that appear in multiple continuous video frames, said determining that positions of the face images of the same person in the multiple video frames meet a predetermined displacement requirement, and forming the face images into a face sequence comprises:
respectively creating face sequences for one or more of at least one face image in a video frame in which a face appears for the first time in the video;
respectively creating face sequences for one or more of the at least one face image that does not appear in the former video frame but appears in the latter video frame; or
incorporating the face images of the same person appearing in the former video frame and the latter video frame and having continuous spatial positions, into the face sequence of the same person.

4. The method according to claim 3, wherein the incorporating the face images of the same person appearing in the former video frame and the latter video frame and having continuous spatial positions, into the face sequence of the same person comprises:
respectively obtaining the a face feature of each of the at least one face image in the former video frame of successively adjacent video frames, a position in the former video frame of each of the at least one face image in the former video frame, a face feature of each of the at least one face image in the latter video frame, and the a position in the latter video frame of each of the at least one face image in the latter video frame;
determining, according to the position in the former video frame of each of the at least one face image in the former video frame and the position in the latter video frame of each of the at least one face image in the latter video frame, a face image pair having displacement meeting the predetermined displacement requirement; and
in a case that the similarity of the face feature pair of the face image pair meets the predetermined similarity requirement, determining, for the face image pair having displacement meeting the predetermined displacement requirement, that the face image of the face image pair in the latter video frame belongs to the face sequence to which the face image in the former video frame belongs.

5. The method according to claim 3, wherein the respectively creating face sequences for one or more of the at least one face image that does not appear in the former video frame but appears in the latter video frame comprises:
in a case that the similarity of the face feature pair of the face image pair does not meet the predetermined similarity requirement, creating, for the face image pair having displacement meeting the predetermined displacement requirement, a face sequence for the face image of the face image pair in the latter video frame.

6. The method according to claim 1, wherein before the performing facial recognition for the face sequence by using a preset face library according to face features in the face sequence, the method further comprising obtaining the face features, and the obtaining the face features comprises:
performing, using a face detector, face detection on at least one video frame to obtain bounding box information of at least one face image in the at least one video frame; and
providing the at least one video frame and the bounding box information of the at least one face image in the at least one video frame to a neural network for face feature extraction, such that each face feature of the at least one face image in the at least one video frame is obtained through the neural network.

7. The method according to claim 1, wherein after the forming a face sequence and before the performing facial recognition for the face sequence by using a preset face library at least according to face features in the face sequence, the method further comprises:
performing clustering processing on at least some face sequences according to the face features of at least some face sequences to combine different face sequences corresponding to the same person,
wherein after the clustering processing, each of the different face sequences corresponds to a respective person.

8. The method according to claim 7, wherein the face features of the at least some face sequence comprise:
a weighted average value of the face features of at least some face images in the face sequence.

9. The method according to claim 8, wherein weight values of the face features of the at least some face images in the face sequence are determined according to a face image quality of the at least some face images.

10. The method according to claim 9, wherein the face image quality comprises at least one of face image light intensity, face image definition, or face orientation.

11. The method according to claim 1, wherein the face library comprises face features of multiple persons, and the face features of any person comprise a comprehensive face feature of the person and face features in different pictures of the person, wherein the comprehensive face feature comprises a weighted average value of the face features in different pictures of the person.

12. The method according to claim 11, wherein the performing facial recognition for the face sequence by using a preset face library according to face features in the face sequence comprises:
computing, for at least one face feature of the face sequence, the similarity between the face feature and the comprehensive face feature of at least one person in the face library, and determining the persons in the face library corresponding to the highest similarities;
voting for the persons in the face library corresponding to the highest similarities determined according to at least some face features of the face sequence, and taking the person having a maximum number of votes as a person to which the face sequence belongs; and
determining, for the face sequence, according to the similarities between at least one face feature of the face sequence and the face features in different pictures of the person in the face library to which the face sequence belongs, a confidence that the face sequence belongs to the person.

13. The method according to claim 12, wherein the determining, according to the similarities between at least one face feature of the face sequence and the face features in different pictures of the person in the face library to which the face sequence belongs, a confidence that the face sequence belongs to the person comprises:
computing, for one of the at least one face feature of the face sequence, a similarity between the one of the at least one face feature and another face feature in a face feature set having the most similar face pose to the one of the at least one face feature; and
determining, according to the computed similarity between the one of the at least one face feature and the another face feature in the face feature set having the most similar face pose to the one of the at least one face feature, the confidence that the face sequence belongs to the person,
wherein the face feature set comprises the face features in different pictures of the person in the face library.

14. The method according to claim 13, wherein the determining, according to the similarities between at least one face feature of the face sequence and the face features in different pictures of the person in the face library to which the face sequence belongs, a confidence that the face sequence belongs to the person comprises:
determining, according to face key points of the face sequence and face key points in the face feature set, the face feature in the face feature set having the most similar face pose to that in the face sequence.

15. The method according to claim 1, wherein the method further comprises:
obtaining, through a neural network, face key points of at least one face image of the video frame.

16. The method according to claim 13, wherein the determining, according to the similarities between at least one face feature of the face sequence and the face features in different pictures of the person in the face library to which the face sequence belongs, a confidence that the face sequence belongs to the person further comprises:
correcting the confidence that the face sequence belongs to the person by using the similarity between the face feature of the face sequence and the comprehensive face feature of the person to which the face sequence belongs.

17. An apparatus for video-based facial recognition, comprising:
a processor; and
a memory for storing instructions executable by the processor,
wherein the processor is configured to:
for face images of a same person, in a video, that appear in multiple continuous video frames, determine that positions of the face images of the same person in the multiple video frames meet a predetermined displacement requirement, and forming the face images into a face sequence, wherein the face sequence is a set of face images of the same person in multiple video frames; and
perform facial recognition for the face sequence by using a preset face library according to face features in the face sequence,
wherein for face images of a same person, in a video, that appear in multiple continuous video frames, said determining that positions of the face images of the same person in the multiple video frames meet a predetermined displacement requirement, and forming the face images into a face sequence comprises:
obtaining the face images of the same person in N continuous video frames of the video, N being an integer greater than two;
determining, in the face images of the same person, a face image pair that a displacement from a position of a face image in a former video frame to a position of the face image in a latter video frame meets the predetermined displacement requirement; and
in a case that an intersection over union of the face image pair meets the predetermined displacement requirement with the face images of the same person satisfies a preset ratio, forming the face images into the face sequence.

18. A non-transitory computer-readable storage medium having a computer program stored thereon, wherein execution of the computer program by a processor causes the operations of:
for face images of a same person, in a video, that appear in multiple continuous video frames, determining that positions of the face images of the same person in the multiple video frames meet a predetermined displacement requirement, and forming the face images into a face sequence, wherein the face sequence is a set of face images of the same person in the multiple video frames; and
performing facial recognition for the face sequence by using a preset face library according to face features in the face sequence, wherein for face images of a same person, in a video, that appear in multiple continuous video frames, said determining that positions of the face images of the same person in the multiple video frames meet a predetermined displacement requirement, and forming the face images into a face sequence comprises:

obtaining the face images of the same person in N continuous video frames of the video, N being an integer greater than two;

determining, in the face images of the same person, a face image pair that a displacement from a position of a face image in a former video frame to a position of the face image in a latter video frame meets the predetermined displacement requirement; and if an intersection over union of the face image pair meets the predetermined displacement requirement with the face images of the same person satisfies a preset ratio, forming the face images into the face sequence.

19. The method according to claim 1, wherein for the face images of a same person, in a video, that appear in multiple continuous video frames, said determining positions of the face images in the multiple video frames meeting a predetermined displacement requirement comprises:

for the face images of the same person appearing in successively continuous video frames, determining that a displacement from the positions of the face images of the same person in a former video frame to the positions of the face images of the same person in a latter video frame meets the predetermined requirement.

* * * * *